(12) United States Patent
Lam

(10) Patent No.: US 8,255,544 B2
(45) Date of Patent: Aug. 28, 2012

(54) ESTABLISHING A SPLIT-TERMINATED COMMUNICATION CONNECTION THROUGH A STATEFUL FIREWALL, WITH NETWORK TRANSPARENCY

(75) Inventor: Blanco Zee Leung Lam, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 13/152,152

(22) Filed: Jun. 2, 2011

(65) Prior Publication Data

US 2011/0264810 A1   Oct. 27, 2011

Related U.S. Application Data

(63) Continuation of application No. 12/398,898, filed on Mar. 5, 2009, now Pat. No. 7,984,160.

(51) Int. Cl.
*G06F 15/16*   (2006.01)

(52) U.S. Cl. ........ 709/227; 709/203; 709/219; 709/239; 709/240

(58) Field of Classification Search ............... 709/203, 709/219, 227, 239, 240
See application file for complete search history.

(56) References Cited

U.S. PATENT DOCUMENTS

| | | | |
|---|---|---|---|
| 5,371,852 A | 12/1994 | Attanasio et al. | |
| 6,104,717 A * | 8/2000 | Coile et al. | 370/401 |
| 6,415,329 B1 | 7/2002 | Gelman et al. | |
| 6,449,658 B1 * | 9/2002 | Lafe et al. | 709/247 |
| 6,507,564 B1 * | 1/2003 | Merchant | 370/244 |
| 6,510,469 B1 * | 1/2003 | Starnes et al. | 709/247 |
| 6,542,964 B1 * | 4/2003 | Scharber | 711/122 |
| 7,363,363 B2 * | 4/2008 | Dal Canto et al. | 709/223 |
| 7,701,956 B2 * | 4/2010 | Howe | 370/401 |
| 7,769,858 B2 * | 8/2010 | Corl et al. | 709/225 |
| 7,948,921 B1 | 5/2011 | Hughes | |
| 7,984,160 B2 | 7/2011 | Lam | |
| 2005/0107102 A1 * | 5/2005 | Yoon et al. | 455/466 |
| 2005/0165885 A1 * | 7/2005 | Wong | 709/201 |
| 2006/0023721 A1 * | 2/2006 | Miyake et al. | 370/395.2 |
| 2007/0038853 A1 * | 2/2007 | Day et al. | 713/153 |
| 2008/0205315 A1 * | 8/2008 | Park et al. | 370/310 |
| 2008/0320151 A1 * | 12/2008 | McCanne et al. | 709/228 |
| 2009/0157888 A1 * | 6/2009 | Demmer et al. | 709/229 |
| 2010/0228867 A1 * | 9/2010 | Lam | 709/228 |
| 2010/0318665 A1 * | 12/2010 | Demmer et al. | 709/227 |

OTHER PUBLICATIONS

Rodriguez, Pablo et al., "TPOT: Translucent Proxying of TCP", Computer Communications, V. 24, No. 2, Feb. 2001.

\* cited by examiner

*Primary Examiner* — Michael Won
(74) *Attorney, Agent, or Firm* — Park, Vaughan, Fleming & Dowler LLP

(57) ABSTRACT

A method and apparatus are provided for establishing a split-terminated client-server communication connection through a stateful firewall, with network transparency. In an environment in which a pair of network intermediaries is employed to optimize client-server communications, a first intermediary intercepts a client request for a new connection. The first intermediary probes the network for a counterpart near the server, and opens an optimized communication session with a second intermediary that responds affirmatively. Some or all client-server communications that transit the intermediaries' session are accelerated or otherwise optimized. The first intermediary's probe uses the client's source address, but a different port number, while the optimized intermediary session is opened using the client's source address and source port. Therefore, a network monitoring tool can monitor the end-to-end connection, and the stateful firewall will not reject the optimized session.

30 Claims, 5 Drawing Sheets

ESTABLISHING A SPLIT-TERMINATED COMMUNICATION CONNECTION THROUGH A STATEFUL FIREWALL, WITH NETWORK TRANSPARENCY

RELATED APPLICATION

This application is a continuation of, and hereby claims priority under 35 U.S.C. §120 to, pending U.S. patent application Ser. No. 12/398,898, entitled "Establishing a Split-Terminated Communication Connection Through a Stateful Firewall, with Network Transparency," by inventor Blanco Zee Leung Lam, which was filed on Mar. 5, 2009.

FIELD

The present invention relates to networked computer systems, and in particular to methods and apparatus for establishing a network-transparent split-terminated communication connection through a stateful firewall.

BACKGROUND

End-to-end communication connections such as those conducted between a client and a server can often be optimized for more efficient and/or rapid transit across a WAN (wide-area network) or other long-haul communication link, such as the Internet. Such optimization is typically performed by a pair of transaction accelerators installed within the path of communication, wherein the accelerators manipulate communications as appropriate to reduce the amount of data that must be conveyed.

For example, a transaction accelerator such as that described in U.S. Pat. No. 7,120,666 (McCanne) can offer performance improvement for operations across a WAN when the data being communicated is either intelligible (i.e., the transaction accelerator can interpret at least parts of the protocol) or repeating (i.e., identical data crosses the network in identical format).

Illustratively, a client-server connection (or other end-to-end communication connection) may be split-terminated at the accelerators, with one of the accelerators receiving messages from the client, manipulating them and forwarding them to a cooperating accelerator. That accelerator processes the communications (e.g., to recover the original messages), then forwards them to the server. Communications passing in the reverse direction are processed similarly. Thus, the overall client-server connection is split into multiple separate sessions.

However, the manner in which transaction accelerators configure their optimized communications may impact other aspects of an organization's networking environment. For example, a transaction accelerator may use its own network address when communicating with another accelerator, but an address of the server or the client when communicating with the client or the server.

More specifically, an accelerator that receives messages from a client may proxy for the server to receive messages directed to the server and to deliver to the client messages originated by the server. Likewise, the other accelerator may proxy for the client to exchange messages from the server. Between themselves, however, the accelerators may exchange optimized communications using their own network addresses.

This scheme usually frustrates an organization's desire for network transparency, which would allow the organization to track communications throughout its network and attribute them to the appropriate endpoints (e.g., client and server). If the organization cannot track communications from one end to another, they may be unable to effectively monitor their network traffic, determine the effectiveness of the transaction accelerators, promote desired QoS (Quality of Service), ensure effective load-balancing, and so on.

However, enabling network transparency is not as simple as using the network addresses of the client and server throughout the split-terminated sessions established by the transaction accelerators. For example, each time an accelerator receives a request from a client for a connection with a server, it must determine whether there is a cooperative accelerator available in the vicinity of the server. If not, the connection cannot be optimized and the client and the server should be allowed to communicate as they would without transaction accelerators.

However, if there is an available server-side accelerator, then the accelerators can perform their optimization. But, they must configure their communications to avoid any possibility of corrupting other data passing between the endpoints. For example, if the server-side accelerator were to fail, communications directed to it from the other accelerator would then be received directly at the server. If the accelerators' communication session could not be differentiated from other connections, the endpoint may accept their data within a different connection and suffer from data corruption.

Further, if a stateful firewall is interposed between the transaction accelerators, their ability to open multiple communication sessions using the same network addresses may be limited. For example, if the accelerators use addresses of the client and the server in order to promote network transparency, a firewall may deny any attempt to open a second connection between the same pair of addresses while a first connection is still open.

SUMMARY

In embodiments of the invention, a method and apparatus are provided for establishing a split-terminated client-server communication connection through a stateful firewall, with network transparency. A pair of network intermediaries is installed between the client and the server (to optimize client-server communications), and the stateful firewall is situated between the intermediaries.

In one embodiment, a first request to initiate a connection with the server (e.g., a TCP SYN packet) is received at a first network intermediary from a client, from a corresponding source address and a source port of the client. This request is temporarily stored so that the first intermediary can determine whether the desired client-server connection can be optimized.

The first intermediary transmits toward the server a probe that represents a request to initiate a connection with the server (e.g., another TCP SYN packet). The probe uses a source address that matches the client's source address, but with a different port. Network monitoring tools can thus accurately monitor the connection attempt and attribute it to the client. Also, the probe comprises a tag (e.g., a particular TCP option) that another intermediary (but not the server) can recognize as a probe).

After receipt of a response to the probe from a cooperative second intermediary operating in logical proximity to the server, the first intermediary transmits toward the server another request to initiate a connection. This request uses the client's source address and source port, and includes a different tag, which the second intermediary will recognize as signifying that an optimized communication session is requested.

The optimized session is thus established between the two intermediaries, and each intermediary establishes separate sessions with its local entity (the client or the server), thereby establishing a split-terminated client-server communication connection with network transparency, despite the existence of a stateful firewall that might otherwise frustrate establishment of the intermediaries' connection.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, methods are provided for establishing a split-terminated communication connection between a client and a server (or two other endpoints) through a stateful firewall. The split-terminated connection satisfies network transparency in that communications transiting the connection are attributable to the endpoints, and thus end-to-end client-server connections can be accurately monitored and analyzed (e.g., with Netflow).

In these embodiments, intermediate network devices (e.g., transaction accelerators) positioned within a communication path between the client and the server are configured to optimize the client-server communications. However, traffic between the intermediaries remains distinguishable from other client and server connections that don't traverse the intermediaries, thereby preventing data corruption if an intermediary fails.

In addition to using client and server addresses between the intermediaries, the split-terminated client-server connection is established without triggering the firewall's protection against attempted connections that may be malicious or erroneous.

Figure 1:
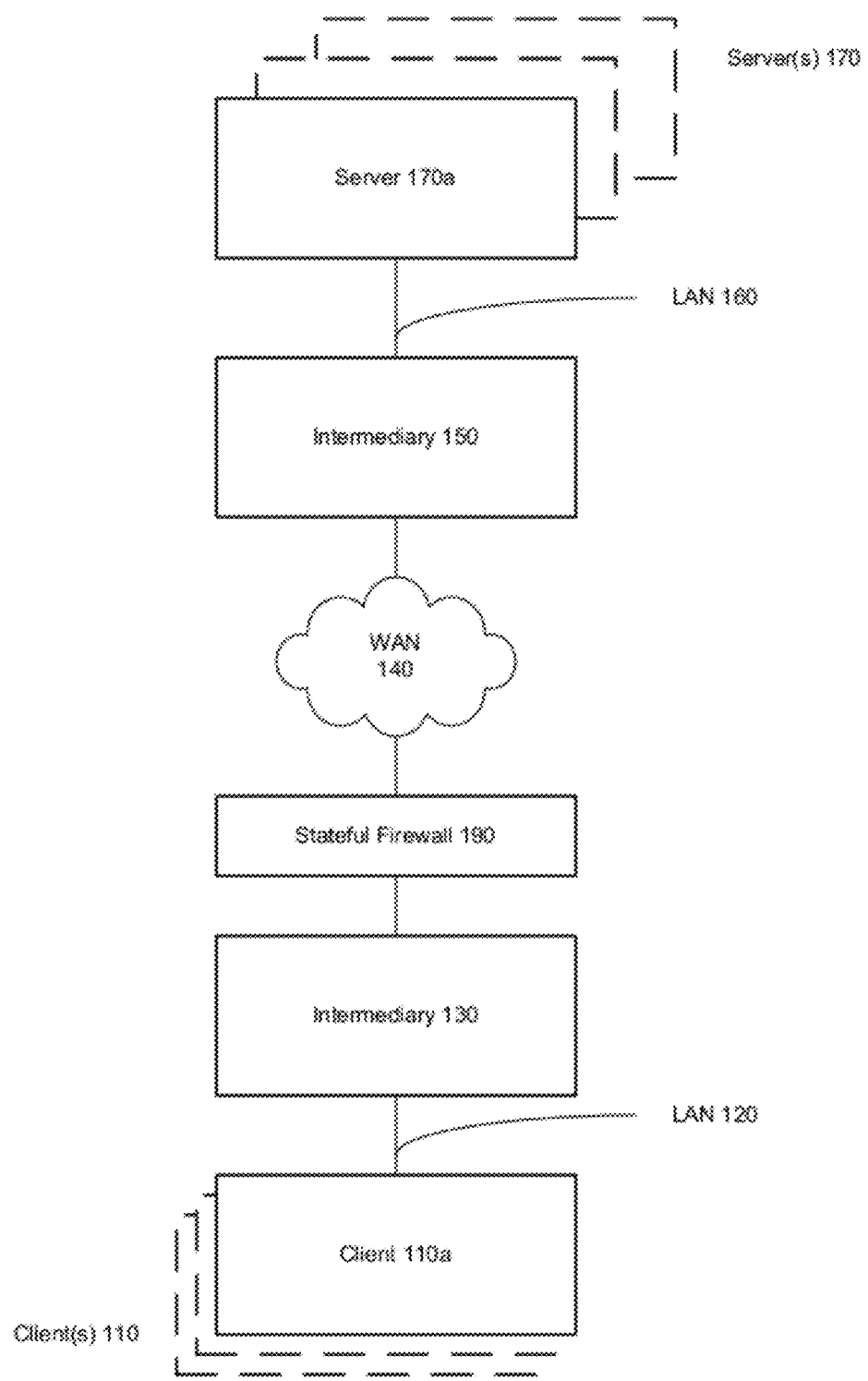
FIG. 1 is a block diagram depicting an environment in which a split-terminated communication connection may be established through a stateful firewall, with network transparency, according to some embodiments of the invention.

FIG. 1 illustrates an environment in which some embodiments of the invention may be implemented. In this environment, clients 110 (e.g., client 110*a*) communicate with servers 170 (e.g., server 170*a*) in client-server relationships. Intermediaries 130, 150 are situated in a path of communication between client 110*a* and server 170*a*.

Intermediaries 130, 150 are coupled to WAN (Wide Area Network) 140, which may comprise the Internet, while client 110*a* is coupled to intermediary 130 via LAN (Local Area Network) 120 and server 170*a* is coupled to intermediary 150 via LAN 160. Thus, intermediary 130 is relatively local to client 110*a*, while intermediary is local to server 170*a* (e.g., within the same data center).

Stateful firewall 190 is interposed between CSI 130 and WAN 140. In other embodiments, a stateful firewall may be employed between the WAN and SSI 150 instead of, or in addition to, firewall 190. A stateful firewall is able to track network connections that traverse the firewall, and can filter individual packets based on established rules. For example, if a packet comprises an attempt to open a network connection that the firewall has been programmed to reject, the packet may be dropped.

In the embodiment of FIG. 1, communications traversing WAN 140 are characterized by relatively high latency and low bandwidth in comparison to communications transiting LANs 120, 160. In other embodiments of the invention, other types of communication links may be employed. For example, LAN 120 and/or LAN 160 may be WANs.

Intermediary 130 may be termed a "client side intermediary" (or CSI) and intermediary 150 may be termed a "server side intermediary" (or SSI) to reflect their relative positions within environment 100. Although not shown in FIG. 1, additional client side intermediaries may also cooperate with server side intermediary 150, and/or client side intermediary 130 may cooperate with other server side intermediaries.

In one particular embodiment of the invention, intermediaries 130, 150 are Steelhead™ transaction accelerators from Riverbed® Technology, and are configured to optimize communications and applications (e.g., through compression or acceleration). In other embodiments, the intermediaries may be configured to perform other operations in addition to or instead of optimization, such as routing, caching, etc.

All communication traffic between client 110*a* and server 170*a* may traverse intermediaries 130, 150 in the illustrated embodiment of the invention. One or both intermediaries may also handle traffic between client 110*a* and entities other than server 170*a*, and/or traffic between server 170*a* and other entities. In other embodiments, the client and server may also utilize other communication paths that avoid one or both of the intermediaries.

It may be noted that no special application, utility or plug-in need be installed on clients 110 or servers 170 in order for them to operate with embodiments of the invention described herein.

Figure 2:
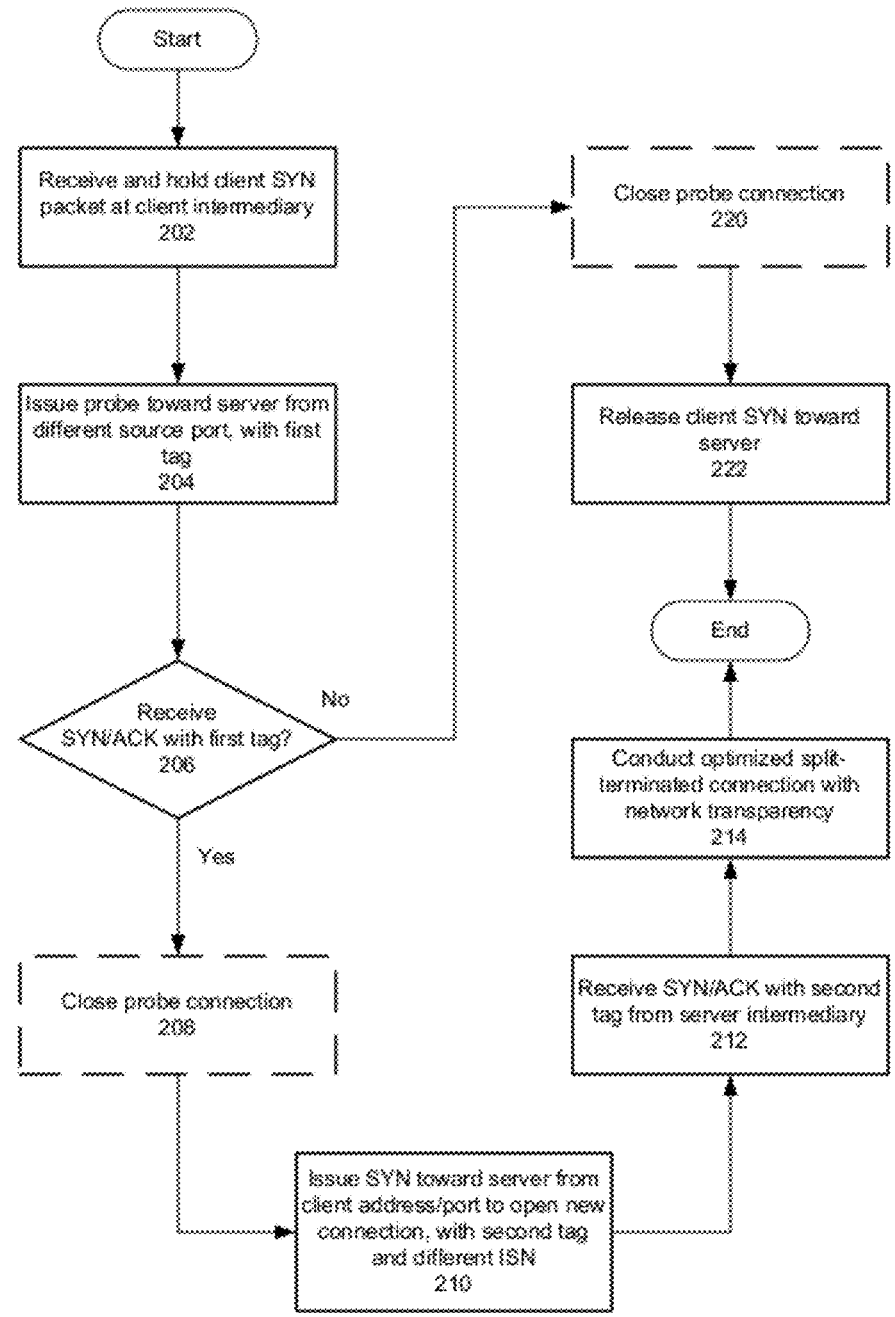
FIG. 2 is a flowchart illustrating one method of establishing a split-terminated communication connection through a stateful firewall with network transparency, in accordance with some embodiments of the invention.

FIG. 2 is a flowchart demonstrating one method of establishing a split-terminated communication connection through a stateful firewall with network transparency, in accordance with some embodiments of the invention.

In these embodiments, a client-side intermediary (CSI) and a server-side intermediary (SSI) are situated between a client and a server, and cooperate to optimize the client-server communications when possible. One or more stateful firewalls are employed, such as between a WAN (or other long-haul communication link) and either or both the CSI and the SSI.

In operation 202, the client-side intermediary receives from a client a SYN packet comprising an attempt to open a TCP (Transport Control Protocol) connection with a server. Based on the destination address of the server, the source address of the client and/or other factors (e.g., type of connection), the CSI recognizes the attempted connection as being one that it may be able to optimize. For example, the CSI may be configured to attempt to optimize all communication connections with a server (or group of servers) at a particular address.

It therefore suppresses the client's SYN packet, at least temporarily, so that it can attempt to open an optimized connection to a cooperating intermediary near the server.

In operation 204, the CSI configures and initiates a probe toward the server, to determine whether such an intermediary exists. In these embodiments of the invention, the probe comprises a new TCP SYN packet. This SYN packet may be directed to a destination address/port matching the destination of the client's SYN packet, and may use a source IP (Internet Protocol) address that matches the client, but with a source TCP port number different than that from which the client SYN packet was issued. It may be noted that by using the client's IP address, a network monitoring tool can monitor the connection attempt.

In some implementations, an arbitrarily large port number may be used for the probe (e.g., 62,148), and different port numbers may be used at different times and/or for different clients. As another alternative, a fixed number (e.g., 50,000) may be added to the TCP port number from which the client's SYN packet was issued. Other schemes may be applied to select a source TCP port different from the client's source TCP port.

In addition, the probe packet is marked with a tag that will be recognizable to another intermediary, but not the destination server. For example, a particular TCP option (e.g., 76) may be set to indicate that the SYN packet is a probe intended to determine whether a cooperative intermediary is available in a path from the CSI to the server. In different embodiments of the invention, the probe packet may be tagged or marked in different manners to indicate its purpose.

In operation 206, the CSI determines whether it has received an appropriate response to the probe. For example, if the SSI is online, it will respond with a TCP SYN/ACK packet that has a destination address/port that matches the source address/port of the probe packet, and a source address/port that matches the address/port to which the CSI's probe was addressed. The response will also be marked to indicate it is a response to the probe (e.g., with the same TCP option 76).

If the CSI detects a response from the SSI, the method continues at operation 208; otherwise, the method advances to operation 220.

In optional operation 208, the probe connection may be closed or reset. This may involve sending a FIN/ACK or an RST packet.

In operation 210, a new TCP SYN packet is issued from the CSI. This connection attempt employs the IP address and TCP port of the client's original SYN packet as its source address/port, and the server's IP address and TCP port as its destination address/port.

Further, the SYN packet is marked with another tag (e.g., TCP option 78), preferably different from the tag used in the SYN packet sent in operation 204, to indicate that the desired communication session is an optimized session.

Yet further, an initial TCP sequence number (or ISN) is specified that is out of range of the sequence number of the client's SYN packet. Changing the sequence number in this manner ensures that if one or both of the intermediaries fail, the client-server connection will be reset and no data corruption will occur.

In operation 212, the CSI receives from the SSI a SYN/ACK packet with a corresponding tag (e.g., TCP option 78). This indicates that an optimized session is now open between the intermediaries.

In operation 214, some or all client-server communications that transit the connection will be optimized. The connection will be terminated when the client or the server terminates the overall client-server connection. After operation 214, the illustrated method ends.

In operation 220, the CSI did not receive an appropriate response from a cooperating intermediary, and therefore no optimized intermediary connection can be opened for this client-server connection. Therefore, the CSI may close the attempted probe connection. This may be particularly advisable if the server responded to the CSI's probe (instead of a server-side intermediary).

In operation 222, the CSI forwards the client's SYN packet to the server. This allows the client and the server to establish a normal, non-optimized client-server connection without the benefit of either intermediary. The method then ends.

In the method illustrated in FIG. 2, the network intermediaries successfully establish a communication session between themselves, and will optimize client-server messages they handle. The end-to-end network transparent connection between the client and the server thus comprises this optimized session and separate sessions between the client and the CSI and between the SSI and the server.

The client-CSI and SSI-server sessions may be established after the CSI-SSI optimized session is established, or the CSI and the SSI may begin creating their respective sessions with the client and the server after they are aware of the desired client-server connection and their mutual existence.

The resulting overall client-server connection can therefore be described as being split-terminated at the network intermediaries. Any or all of the three communication sessions may be secured (e.g., via encryption) to safeguard the client-server communications.

Figure 5:
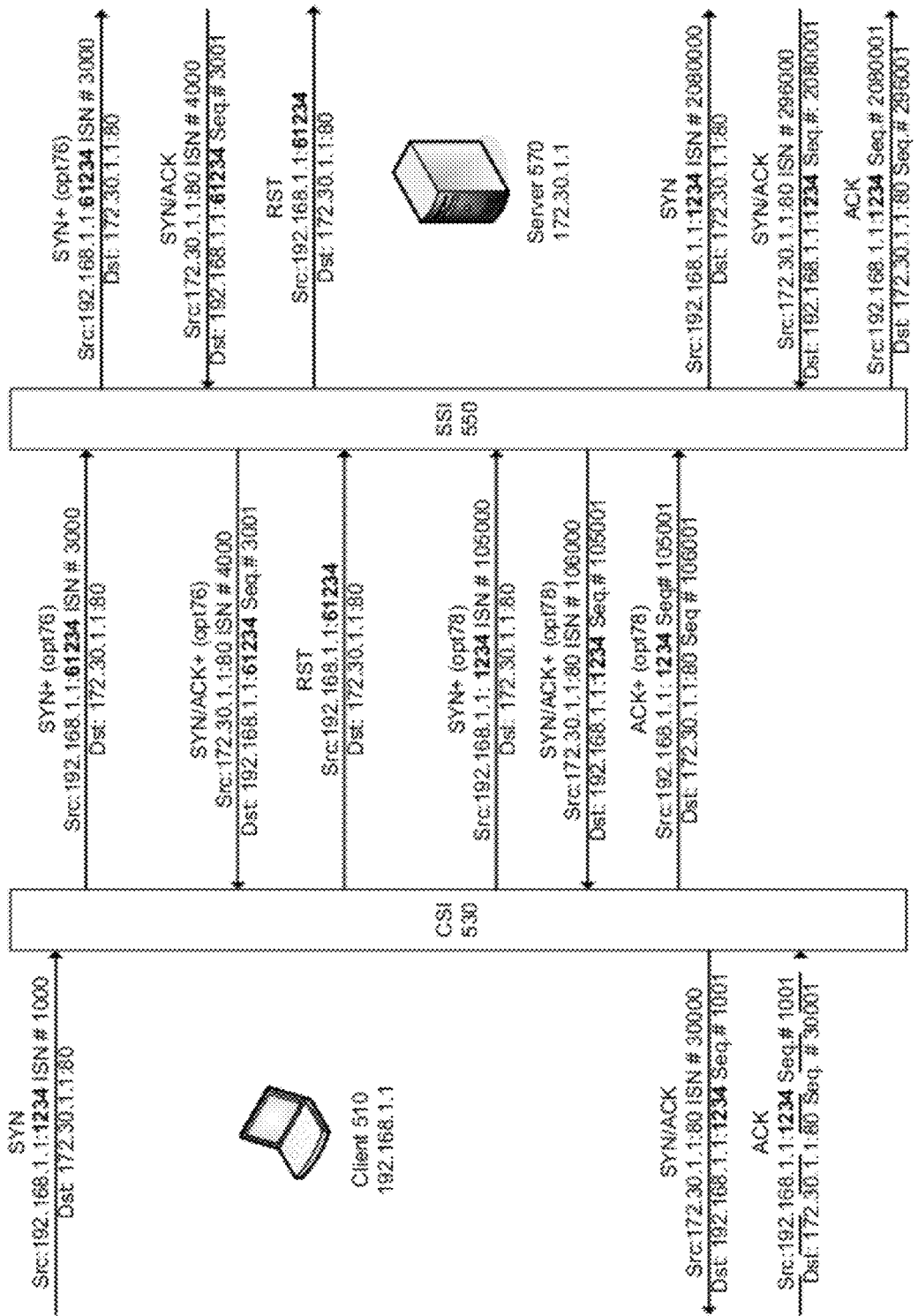
FIG. 5 demonstrates establishment of a split-terminated communication connection through a stateful firewall, with network transparency, according to some embodiments of the invention.

FIG. 5 exemplifies establishment of a split-terminated client-server communication connection through a stateful firewall, with network transparency, according to some embodiments of the invention. The split-terminated connection is established between client 510, which has an illustrative IP address of 192.168.1.1, and server 570, which has an illustrative IP address of 172.30.1.1, via client side intermediary (CSI) 530 and server side intermediary (SSI) 550.

In these embodiments of the invention, at least one stateful firewall capable of severing or rejecting communication connections operates between CSI 530 and SSI 550 (but is not illustrated in FIG. 5).

This example establishment of a connection commences with a client request for client-server connection, issued from TCP port 1234 of the client, to TCP port 80 of the server, with an initial sequence number (ISN) of 1000.

Interception of this connection request prompts the CSI to issue a SYN packet with a TCP option (e.g., option 76) to the SSI. It may be noted that this probe is sent with the same client IP address, but with a different port (i.e., 61234), and with an ISN (i.e., 3000) out of range of that of the client's original SYN packet. The probe connection request is directed to the same server address/port as the client's request.

SSI 550, upon receipt of the CSI's probe, forwards the probe connection request to the server, with the same source address/port, destination address/port and ISN, and possibly including the TCP option. However, the server is not configured to interpret the option as signifying a probe connection.

By marking the SYN directed toward the server with the TCP option, a server side intermediary that may happen to be closer to the server than SSI 550 (and that receives the SYN with the TCP option), will respond appropriately. In such an embodiment of the invention, the CSI may subsequently establish the optimized communication session with the closer/closest SSI, rather than SSI 550.

The resulting SYN/ACK from server 570 reflects the SYN it received from the SSI. The source and destination addresses/ports of the SYN are reversed, and the SYN/ACK has an appropriate sequence number (i.e., 3001) and ISN (i.e., 4000). Because the server does not recognize the significance of the TCP option, it does not include it in the SYN/ACK. This message is forwarded from the SSI to CSI 530.

The SSI then terminates the probe connection with the server by issuing RST, with the same source and destination addresses/ports as the SYN that initiated the connection. The CSI likewise terminates the probe connection with the SSI by issuing a matching (or similar) RST. Issuing RSTs to terminate the probe sessions allows the communicants to recycle resources used for those sessions sooner than they would if they simply waited for the sessions to time-out.

CSI 530 then initiates an optimized session with the SSI. The SYN issued to accomplish this is similar to the client's original connection request, in that the source and destination addresses/ports are identical. However, another TCP option is set that signifies an optimized session (e.g., option 78), and a different ISN is specified that is well out of range of the client's connection request (i.e., 105000).

The SSI responds with a SYN/ACK having the same TCP option, addressed to the client's address/port, and with the appropriate destination sequence number (i.e., 105001) and a suitable ISN (i.e., 106000). The CSI finalizes the optimized session with an ACK that repeats the TCP option and has appropriate source and destination sequence numbers (i.e., 105001 and 106001, respectively).

Following creation of the optimized intermediary-intermediary session, CSI 530 and SSI 550 finalize establishment of the split-terminated client-server connection by establishing sessions with the client and the server, respectively.

CSI 530 therefore responds to the client's original connection request by returning a SYN/ACK having the appropriate destination sequence number (i.e., 1001) and a suitable initial sequence number (e.g., 30000). The client will generally return an ACK to acknowledge the connection.

Meanwhile, SSI 550 opens a session with the server by issuing a SYN using the same source and destination addresses/ports as the client's original request, but with a different ISN (e.g., 2080000) that is well out of range of sequence numbers used in other portions of the split-terminated connection. The server responds normally with the appropriate SYN/ACK, and the SSI completes the session with an ACK.

The split-terminated client-server connection is thus established using the client's and server's address/port throughout, but with different sequence number ranges.

Figure 3:
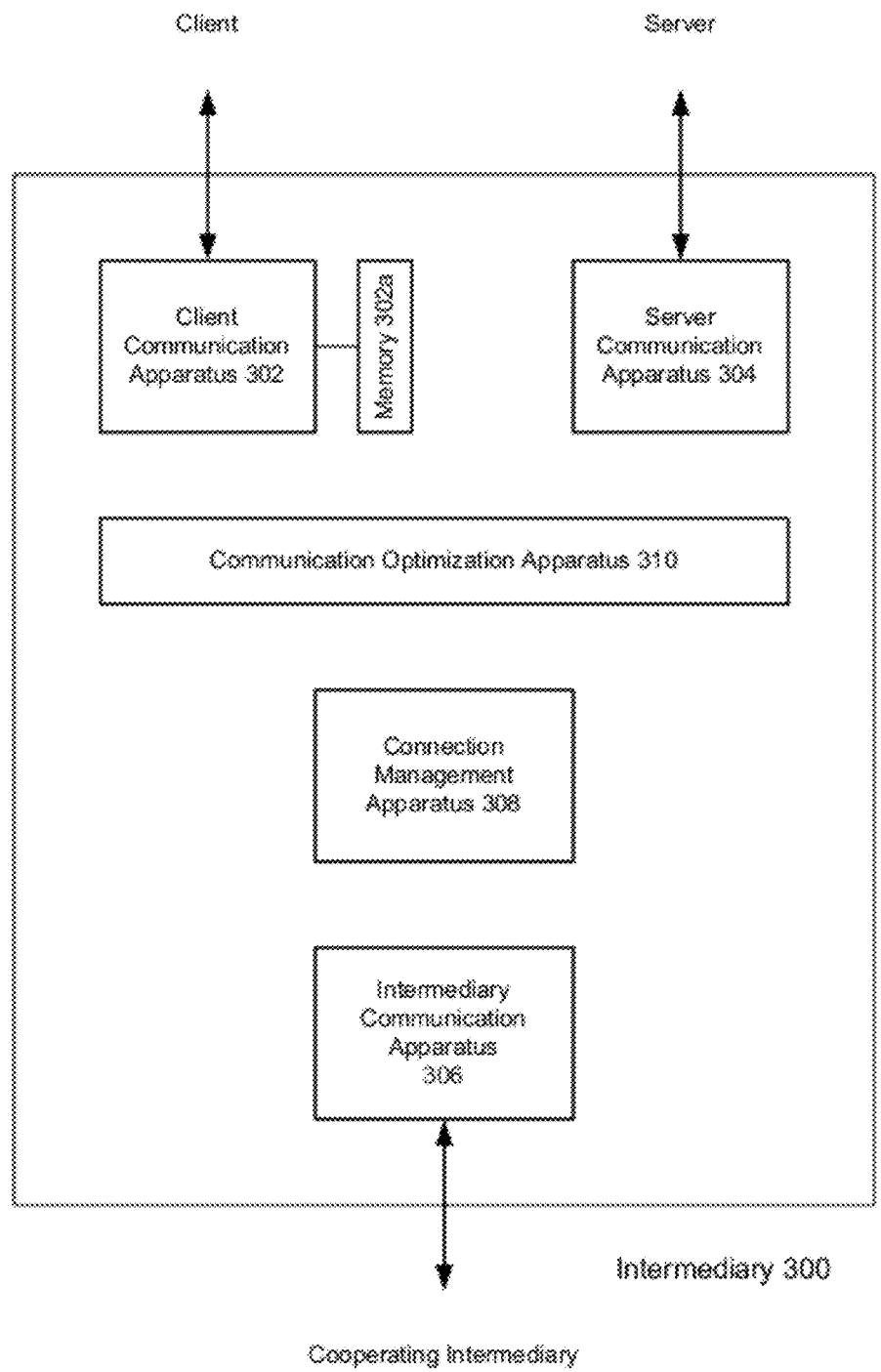
FIG. 3 is a block diagram of apparatus with which a split-terminated communication connection may be established through a stateful firewall, with network transparency, according to some embodiments of the invention.

FIG. 3 is a block diagram of hardware apparatus that may be employed to facilitate establishment of a split-terminated client-server connection through a stateful firewall, with network transparency, according to some embodiments of the invention.

Intermediary 300 of FIG. 3 comprises communication apparatuses 302, 304 and 306 for communicating with a client, a server and another intermediary, respectively. Any or all of these communication apparatuses may be combined in other embodiments of the invention.

The communication apparatuses are adapted to transmit communications to, and receive communications from, the indicated entities. The communication apparatuses may also be adapted to assemble/extract components of a communication, and/or to encrypt/decrypt a communication as needed.

Intermediary 300 also comprises memory 302*a* coupled to client communication mechanism 302, for temporarily storing new SYN packets received from clients. As described previously, such SYN packets may be suppressed while the intermediary attempts to open an optimized connection in place of the client's requested connection.

Connection management apparatus 308 is adapted to establish and manage communication sessions with external entities. Thus, apparatus 308 may be responsible for sending (or responding to) probe connections that test for the existence of a cooperative intermediary, and establishing an optimized connection with another intermediary. Apparatus 308 may also be responsible for identifying new connection requests (from clients), establishing communication sessions with a client or server (depending on whether the intermediary is a client-side or server-side intermediary), selecting IP addresses and TCP port numbers to use for connections, etc.

Communication optimization apparatus 310 is adapted to optimize communications that transit an optimized session with another intermediary. Thus, apparatus 310 may compress (or expand), encrypt (or decrypt), cache or otherwise enhance the efficiency of client-server communications.

Figure 4:
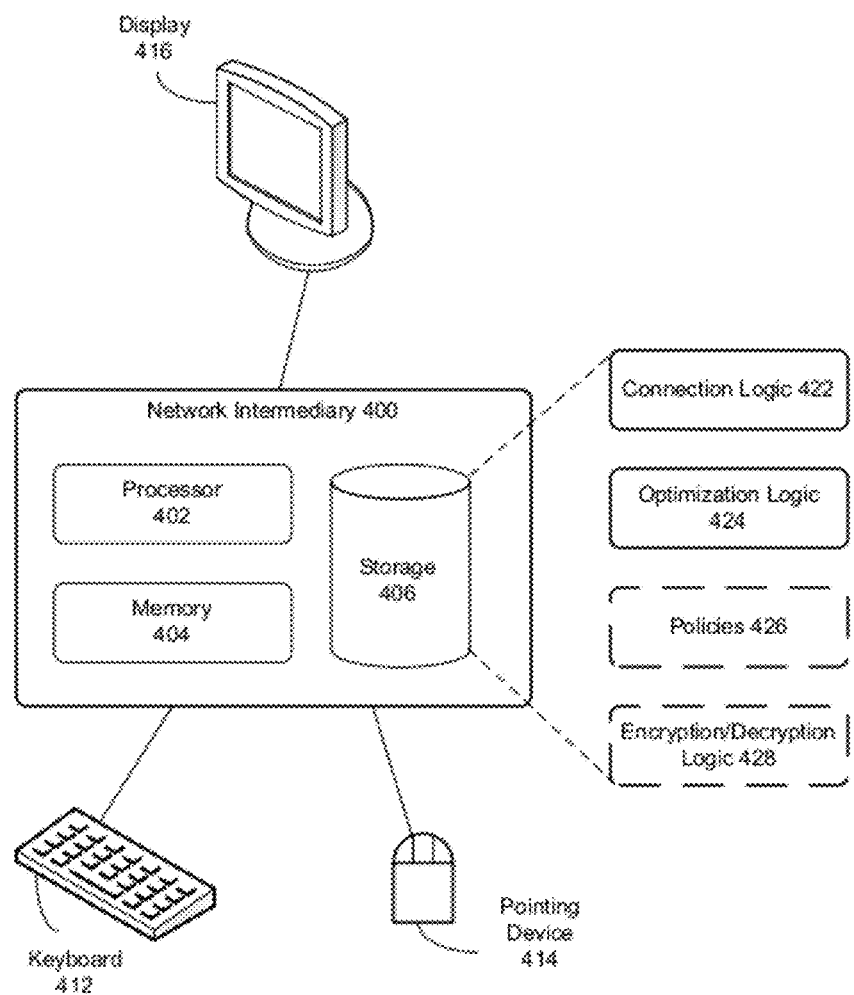
FIG. 4 is a block diagram of a network intermediary with which a split-terminated communication connection may be established through a stateful firewall, with network transparency, according to some embodiments of the invention.

FIG. 4 is a block diagram of a network intermediary that may be employed to facilitate establishment of a split-terminated client-server connection through a stateful firewall, with network transparency, according to some embodiments of the invention.

Network intermediary 400 of FIG. 4 comprises processor 402, memory 404 and storage 406, which may comprise one or more optical and/or magnetic storage components. Network intermediary 400 may be coupled (permanently or transiently) to keyboard 412, pointing device 414 and display 416.

Storage 406 of the network intermediary stores various logic that may be loaded into memory 404 for execution by processor 402. Such logic includes connection logic 422, optimization logic 424 and policies 426.

Connection logic 422 comprises processor-executable instructions for establishing, maintaining and terminating communication sessions. Such sessions may be with other network intermediaries, clients and/or servers.

Optimization logic 424 comprises processor-executable instructions for optimizing a communication. Such optimization may involve replacing all or a portion of the communication with substitute content for transmission to another network intermediary, exchanging substitute content in a communication received from another intermediary for its original content, compressing (or decompressing) content of a communication, etc.

Optional policies 426 comprise processor-executable instructions for determining and applying operating rules of network intermediary 400. For example, one type of policy may identify when the intermediary should (or should not) attempt to establish an optimized communication session.

Optional encryption/decryption logic 428 comprises processor-executable instructions for encrypting/decrypting, as needed, communications (or portions of communications) received at or transmitted from intermediary 400.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A network intermediary apparatus for facilitating establishment of a network-transparent communication connection between a client and a server, through a stateful firewall, the network intermediary apparatus comprising:
   a client communication apparatus adapted to receive from the client a request for the client-server connection;
   a connection management apparatus adapted to:
      determine whether another network intermediary apparatus capable of establishing optimized communication sessions through the stateful firewall exists in logical proximity to the server; and
      if the other network intermediary apparatus exists, establish an optimized communication session with the other network intermediary apparatus; and
   an optimization apparatus configured to optimize at least a portion of client-server communications that transit the optimized communication session.

2. The network intermediary apparatus of claim 1, wherein said connection management apparatus is further adapted to:
   determine whether the other network intermediary apparatus exists by sending a test connection request from a source address of the client and a source port different from a client source port; and
   establish the optimized communication session from the source address of the client and a source port of the client.

3. The network intermediary apparatus of claim 2, wherein said connection management apparatus is further configured to:
   configure the test connection request with an initial sequence number out of range of an initial sequence number of the request for the client-server connection; and
   configure a request for the optimized communication session with an initial sequence number out of range of the initial sequence number of the request for the client-server connection.

4. The network intermediary apparatus of claim 1, wherein said connection management apparatus determines whether another network intermediary exists in logical proximity to the server by:
   identifying, in the request for the client-server connection, a source address and a first source port of the client; and
   issuing toward the server a replacement request, wherein the replacement comprises the source address of the client and a second source port different from the first source port.

5. The network intermediary apparatus of claim 4, wherein said connection management apparatus establishes an optimized communication session with the other network intermediary apparatus by:
   issuing toward the server a final request, wherein the final request comprises the source address of the client and the first source port.

6. The network intermediary apparatus of claim 5, wherein:
   the replacement request comprises a first tag understandable by the other network intermediary apparatus as a probe to determine whether the other network intermediary apparatus is active; and
   the final request comprises a second tag understandable by the other network intermediary apparatus as a request for an optimized client-server connection.

7. The network intermediary apparatus of claim 6, wherein said first tag and said second tag comprise different TCP (Transport Control Protocol) options.

8. The network intermediary apparatus of claim 4, wherein:
   the request for the client-server connection comprises a first initial sequence number; and
   the replacement request comprises a second initial sequence number out of range of the first initial sequence number.

9. The network intermediary apparatus of claim 8, wherein the final request comprises a third initial sequence number out of range of the first initial sequence number.

10. The network intermediary apparatus of claim 1, further comprising:
    a memory for temporarily storing the request for the client-server connection until said connection management apparatus determines whether another network intermediary exists in logical proximity to the server.

11. A method for facilitating establishment of a network transparent communication connection between a client and a server through a stateful firewall, the method comprising:
    in a network intermediary apparatus:
       receiving from the client a request for the client-server connection;
       determining whether another network intermediary apparatus capable of establishing optimized communication sessions through the stateful firewall exists in logical proximity to the server; and
       in response to determining that the other network intermediary apparatus capable of establishing optimized communication sessions through the stateful firewall exists in logical proximity to the server, establishing an optimized communication session with the other network intermediary apparatus; and optimizing at least a portion of client-server communications that transit the optimized communication session.

12. The method of claim 11, wherein said determining includes sending a test connection request from a source address of the client and a source port different from a client source port; and wherein said establishing includes establishing the optimized communication session from the source address of the client and a source port of the client.

13. The method of claim 12, wherein said determining includes configuring the test connection request with an initial sequence number out of range of an initial sequence number of the request for the client-server connection; and wherein said establishing includes configuring a request for the optimized communication session with an initial sequence number out of range of the initial sequence number of the request for the client-server connection.

14. The method of claim 11, wherein said determining includes: identifying, in the request for the client-server connection, a source address and a first source port of the client; and issuing toward the server a replacement request, wherein the replacement comprises the source address of the client and a second source port different from the first source port.

15. The method of claim 14, wherein said establishing includes issuing toward the server a final request, wherein the final request comprises the source address of the client and the first source port.

16. The method of claim 15, wherein: the replacement request comprises a first tag understandable by the other network intermediary apparatus as a probe to determine whether the other network intermediary apparatus is active; and the final request comprises a second tag understandable by the other network intermediary apparatus as a request for an optimized client-server connection.

17. The method of claim 16, wherein said first tag and said second tag comprise different TCP (Transport Control Protocol) options.

18. The method of claim 14, wherein: the request for the client-server connection comprises a first initial sequence number; and the replacement request comprises a second initial sequence number out of range of the first initial sequence number.

19. The method of claim 18, wherein the final request comprises a third initial sequence number out of range of the first initial sequence number.

20. The method of claim 11, further comprising temporarily storing the request for the client-server connection until said connection management apparatus determines whether another network intermediary exists in logical proximity to the server.

21. A non-transitory computer-readable storage medium storing instructions that, when executed by a network intermediary apparatus, cause the network intermediary apparatus to perform a method for facilitating establishment of a network-transparent communication connection between a client and a server through a stateful firewall, the method comprising:

receiving from the client a request for the client-server connection;

determining whether another network intermediary apparatus capable of establishing optimized communication sessions through the stateful firewall exists in logical proximity to the server; and in response to determining that the other network intermediary apparatus capable of establishing optimized communication sessions through the stateful firewall exists in logical proximity to the server, establishing an optimized communication session with the other network intermediary apparatus; and optimizing at least a portion of client-server communications that transit the optimized communication session.

22. The non-transitory computer-readable storage medium of claim 21, wherein said determining includes sending a test connection request from a source address of the client and a source port different from a client source port; and wherein said establishing includes establishing the optimized communication session from the source address of the client and a source port of the client.

23. The non-transitory computer-readable storage medium of claim 22, wherein said determining includes configuring the test connection request with an initial sequence number out of range of an initial sequence number of the request for the client-server connection; and wherein said establishing includes configuring a request for the optimized communication session with an initial sequence number out of range of the initial sequence number of the request for the client-server connection.

24. The non-transitory computer-readable storage medium of claim 21, wherein said determining includes: identifying, in the request for the client-server connection, a source address and a first source port of the client; and issuing toward the server a replacement request, wherein the replacement comprises the source address of the client and a second source port different from the first source port.

25. The non-transitory computer-readable storage medium of claim 24, wherein said establishing includes issuing toward the server a final request, wherein the final request comprises the source address of the client and the first source port.

26. The non-transitory computer-readable storage medium of claim 25, wherein: the replacement request comprises a first tag understandable by the other network intermediary apparatus as a probe to determine whether the other network intermediary apparatus is active; and the final request comprises a second tag understandable by the other network intermediary apparatus as a request for an optimized client-server connection.

27. The non-transitory computer-readable storage medium of claim 26, wherein said first tag and said second tag comprise different TCP (Transport Control Protocol) options.

28. The non-transitory computer-readable storage medium of claim 24, wherein: the request for the client-server connection comprises a first initial sequence number; and the replacement request comprises a second initial sequence number out of range of the first initial sequence number.

29. The non-transitory computer-readable storage medium of claim 28, wherein the final request comprises a third initial sequence number out of range of the first initial sequence number.

30. The non-transitory computer-readable storage medium of claim 21, the method further comprising temporarily storing the request for the client-server connection until said connection management apparatus determines whether another network intermediary exists in logical proximity to the server.

\* \* \* \* \*